March 31, 1970

R. P. STEWART 3,503,144

CONVERTIBLE LOADING AND PLOWING DEVICE

Filed March 16, 1967

Inventor
Richard P. Stewart
By Hofgren, Wegner,
Allen, Stellman & McCord
Attys March 31, 1970 R. P. STEWART 3,503,144
CONVERTIBLE LOADING AND PLOWING DEVICE
Filed March 16, 1967 7 Sheets-Sheet 5

March 31, 1970    R. P. STEWART    3,503,144
CONVERTIBLE LOADING AND PLOWING DEVICE
Filed March 16, 1967    7 Sheets-Sheet 6

United States Patent Office 3,503,144
Patented Mar. 31, 1970

3,503,144
CONVERTIBLE LOADING AND PLOWING DEVICE
Richard P. Stewart, Omaha, Nebr., assignor to Omsteel Industries, Inc., a corporation of Nebraska
Continuation-in-part of application Ser. No. 502,162, Oct. 22, 1965. This application Mar. 16, 1967, Ser. No. 623,654
Int. Cl. E02f 3/83
U.S. Cl. 37—117.5    17 Claims

ABSTRACT OF THE DISCLOSURE

A loading device to be mounted for vertical movement relative to a vehicle and including a bucket having a concave wrapper with front and back terminal sections extending at an included angle of about 90° with the front terminal section being arranged to have a 20°–30° angle with the ground when in contact therewith, there being a blade on the front terminal section and pivotal mounting means on the bucket having vertically spaced axes with the lower of the axes being only slightly above the level of the blade when the device is in an initial loading position. Additionally, there is provided a cradle pivotally connectable to the lift structure of the vehicle for carrying the bucket for movement between a forwardly tilted plow position and an upright load carrying position, a pivotal mount interconnecting the bucket and the cradle and having a pivot axis extending transverse to the length of the bucket and a collapsible strut member extending between the cradle and the bucket to brace the bucket when the same is pivoted about the transverse axis to a plowing angle.

CROSS REFERENCES TO OTHER APPLICATIONS

This application is a continuation-in-part of my application Ser. No. 502,162, filed Oct. 22, 1965, now abandoned.

BACKGROUND OF THE INVENTION

There are presently available on the market material loaders for use with a vehicle, such as a tractor, which have a bucket mounted directly on lift arms or on a cradle supported on the lift arms and actuated by suitable mechanism to pick up a load of material and then elevate the load for discharge from the bucket. Such unloaders can dump forwardly or, in some cases, to the side with the latter type permitting dumping into another vehicle such as a truck, with less manipulation of the vehicle bearing the loading bucket. Such loaders would be more versatile if they could efficiently perform plowing operations, such as snow plowing, and one general purpose of this invention is to provide such a device for the plowing of material. It is also common in the industry when working with only moderately heavy material stockpiled or having a free-working face, as distinguished from rock or heavy clays, to use a relatively large bucket to handle a large volume in which the front and rear terminal sections of the bucket have an included angle of from 30–75° which is the same angle as a conventional bucket. These known buckets, when used in loading, tend to have the material crowd and turn back on itself for a relatively poor loading action. Also, with known bucket constructions, a substantial sacrifice is made in dumping heights and reach because of the extent to which the bucket must be tipped forward for dumping material therefrom, with this problem being further aggravated when an even larger bucket is used to maximize capacity of the unit when handling materials of relatively lesser density.

SUMMARY OF THE INVENTION

One general object of this invention is to provide a new and improved material loader which can also perform as a material spreader or plow.

More specifically, it is an object of the invention to provide a material handling device having a bucket which can be positioned in the previously known positions for material loading, elevating and dumping, and which further can be positioned to place a plow blade on the bucket in position for plowing with the bucket at a plow angle relative to the vehicle and with automatically-positioned strut support structure to provide sufficient strength to the bucket for performing a plowing operation.

Another object of the invention is to provide a device, as defined in the preceding paragraph, in which the bucket is provided with means to latch the bucket in loading position, with the latch means being automatically releasable upon energization of a control circuit to move the bucket away from loading position; the bucket is formed with a discharge spout at a discharge end thereof for directing the material out of the bucket during discharge of the material; and remotely operable skid shoes are positioned along an edge of the bucket to provide support for the bucket when in plowing operation.

Still another object of the invention is to provide a device for material loading and plowing including a bucket which has a length greater than the width of the vehicle path sufficient to have the bucket still of an effective length greater than the width of the vehicle path when the bucket is disposed at an angle to the path for plowing operation.

A further object of the invention is to provide a material loading and plowing device having a cradle mountable to a vehicle for elevating movement and tilting movement and a bucket mounted on the cradle for pivotal movement thereon to a variety of positions including a loading position, a dumping position, and an intermediate plowing position and a strut structure connected between the cradle and bucket and effective to brace the bucket adjacent the end remote from the discharge end thereof whereby the bucket support structure has sufficient compressive strength during the plowing operation with the strut not interferring with further angular movement of the bucket from the plowing position to a dumping position. Another general object of this invention is to provide a new and improved loading device having a bucket which provides a livelier loading action of material and which permits complete dumping of material therefrom with reduced sacrifice of dumping height and reach and further, in which the building up of parasitic loads is substantially avoided.

Still another object of the invention is to provide a loading device having a bucket and a mounting cradle therefor, with the cradle pivotally connected to an elevating mounting associated with a vehicle and wherein the bucket has a wrapper with front and rear terminal sections positioned to extend at an included angle in excess of 75° to provide a relatively wide and shallow bucket to facilitate cutting, crowding, lifting, and carrying a load of moderately heavy material, such as coal, snow, sand, shale and the like.

Still another object of the invention is to provide a loading device, as defined in the preceding paragraph wherein the bucket and cradle are related to have the parts in loading position with the cradle adjacent the ground and the front terminal section of the bucket wrapper at an angle of approximately 20° or more relative to the ground to obtain a lively loading action of material in the bucket by causing lifting and rolling of the material as the bucket advances into the material.

A further object of the invention is to provide a loading device as defined in the preceding paragraphs wherein the cradle is pivoted to the elevating mounting on two spaced pivot axes with the lower axis generally behind the front edge of the bucket when in loading position and the upper pivot axis being generally behind the mid-part of the bucket when the bucket is in loading position and the pivot axes being in generally the same spatial relation for both loading and dumping because the angle of the wrapper front terminal section need increase only slightly from the normal loading attitude for a dumping operation about the lower pivot axis thereby minimizing any sacrifice of dumping height.

Further objects and advantages will become apparent from the following detailed description taken in connection with the accompanying drawings.

DETAILED DESCRIPTION

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Figures 1, 10:
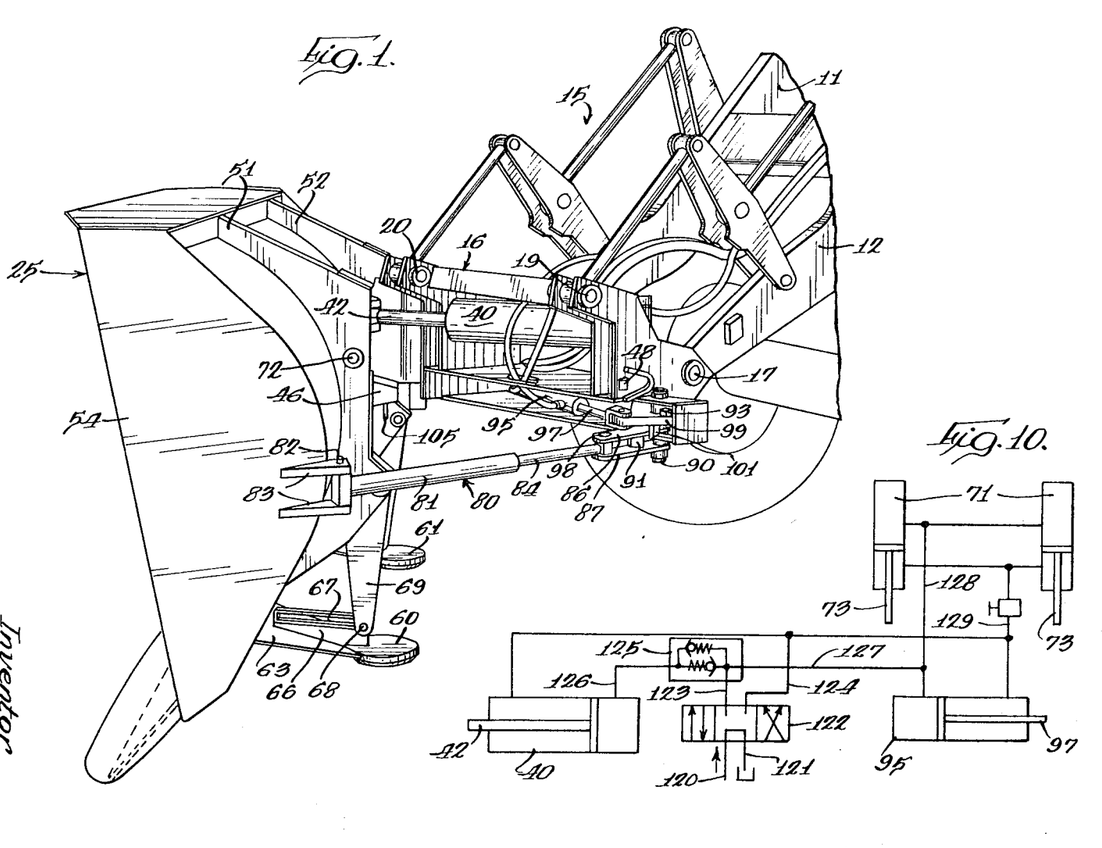
FIG. 1 is a fragmentary view in perspective showing the material loading and plowing device in plowing position and as mounted upon a vehicle.
FIG. 10 is a schematic circuit diagram of the fluid control circuit for the operating cylinders.

The invention disclosed herein is shown in association with a vehicle such as a wheel loader Model 922A as manufactured by Caterpillar Tractor Co., although the bucket loading and plowing structure could be used with other types of vehicles. As shown in FIG. 1, the vehicle has wheels 10 although it could be of the track type, and has a lift structure including a pair of lift arms 11 and 12 which may move in elevation under the control of a power cylinder (not shown) carried on the vehicle. The lift arms mount a tilt arm system having a series of levers and connecting arms indicated generally at 15 which connect to a cradle indicated generally at 16. The cradle is pivoted to the lift arms 11 and 12 at the forward ends thereof by pivot pins 17 and 18. The pivotal connection of the tilt arms to the upper end of the cradle is provided by pivot pins 19 and 20 in FIGS. 1 and 2.

Figure 8:
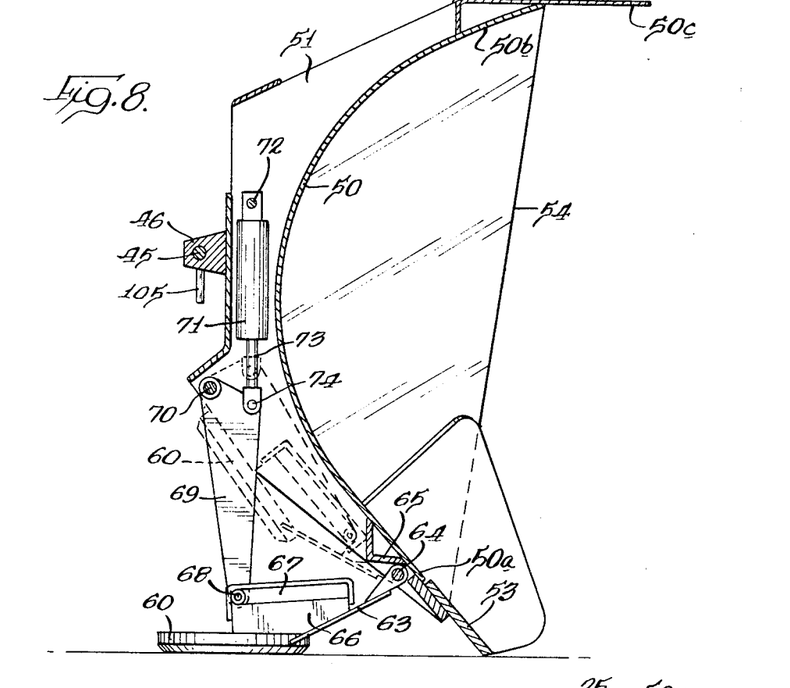
FIG. 8 is a section taken generally along the line 8—8 in FIG. 3 showing one of the skid shoes and its positioning structure.
Figure 9:
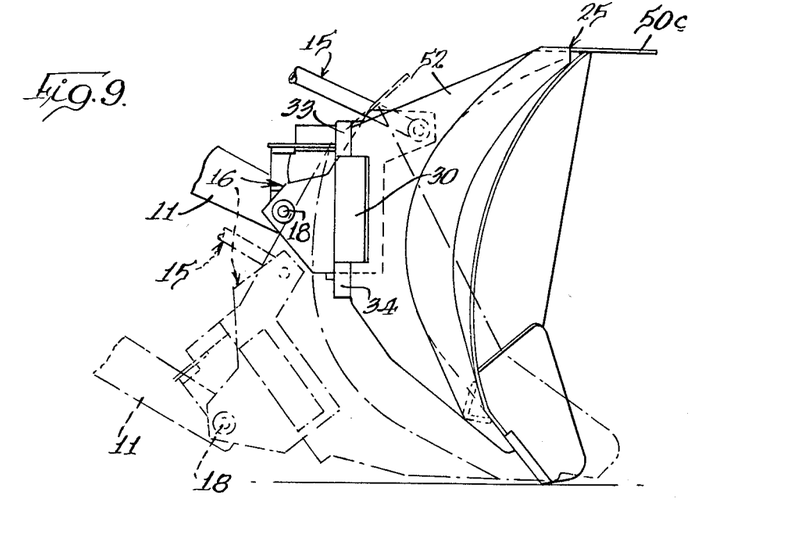
FIG. 9 is a partial side elevational view of the bucket showing a plowing position in full line and a loading position in broken line.

The pivot pins 17 and 18 for the cradle pivotally mount it to the lift arms 11 and 12 and define a first pivot axis extending generally transverse to the longitudinal axis of the vehicle for the cradle and a bucket, indicated generally at 25, which is carried by the cradle 16. With the parts positioned as shown in FIG. 1, the cradle has been tilted forwardly to position the bucket in a plowing disposition in which a plowing operation can be performed. This disposition is also shown in FIGS. 8 and 9. With the bucket 25 in retracted position in latched relation with the cradle 16, the cradle can be tipped rearwardly about its pivot axis to place the bucket in a loading position, as shown in broken line in FIG. 9. These various positions of the cradle can be controlled from the vehicle through the position of the tilt arm system 15, as known in the art.

The frame of the cradle 16 mounts a pivot sleeve 30 by means of a laterally extending rib 31 to receive a pivot pin 32 passing through a pair of apertured ears 33 and 34 formed on the bucket frame structure. This construction provides a second pivot axis for the bucket 25 with this pivot axis being transverse to the pivot axis provided by the mounting of the cradle on the lift arms and to the length of the bucket 25. This pivot axis enables positioning of the bucket in a loading position or a load elevating position shown in full line in FIG. 2, a plowing position at an angle to the cradle 16, shown in FIGS. 1 and 3, and a load side dumping position at a greater angle and which is beyond the position shown in broken line in FIG. 2.

Means are provided for moving the bucket 25 to the various positions referred to comprising a power cylinder 40 having the cylinder casing pivoted to the cradle frame by a pivot pin 41 and having a piston rod 42 pivoted to the bucket frame by a pivot pin 43. The power cylinder 40 is supplied with a pressure fluid to one or the other end thereof through a hydraulic circuit, to be described subsequently and shown in FIG. 10.

Figure 2:
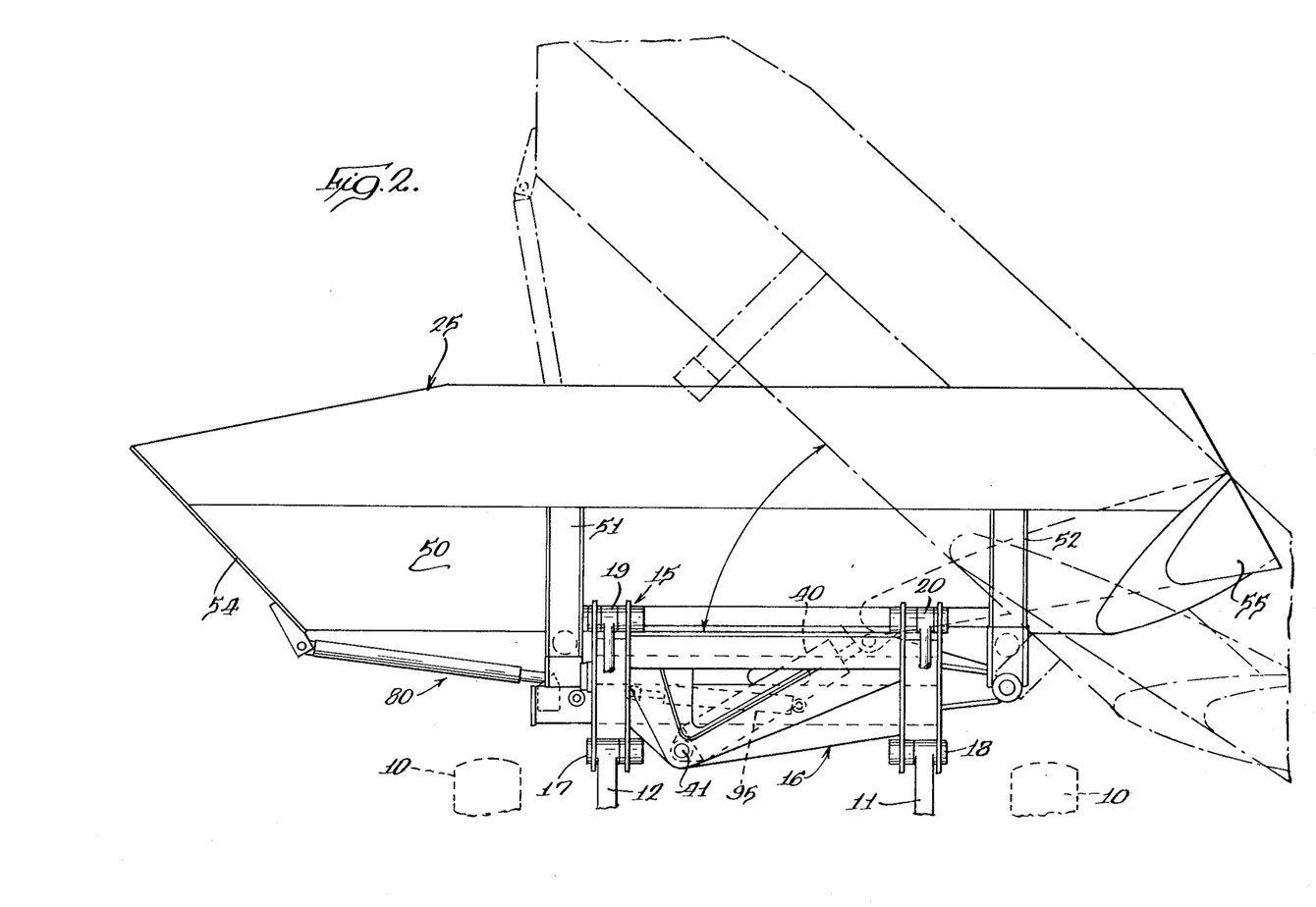
FIG. 2 is a partial plan view of the structure shown in FIG. 1 and with the bucket shown slightly beyond the position of FIG. 1 in broken line and in withdrawn loading position in full line. This view also functions to show the parts in elevation in load elevating relation in full line and almost at a material dumping position in broken line.
Figure 3:
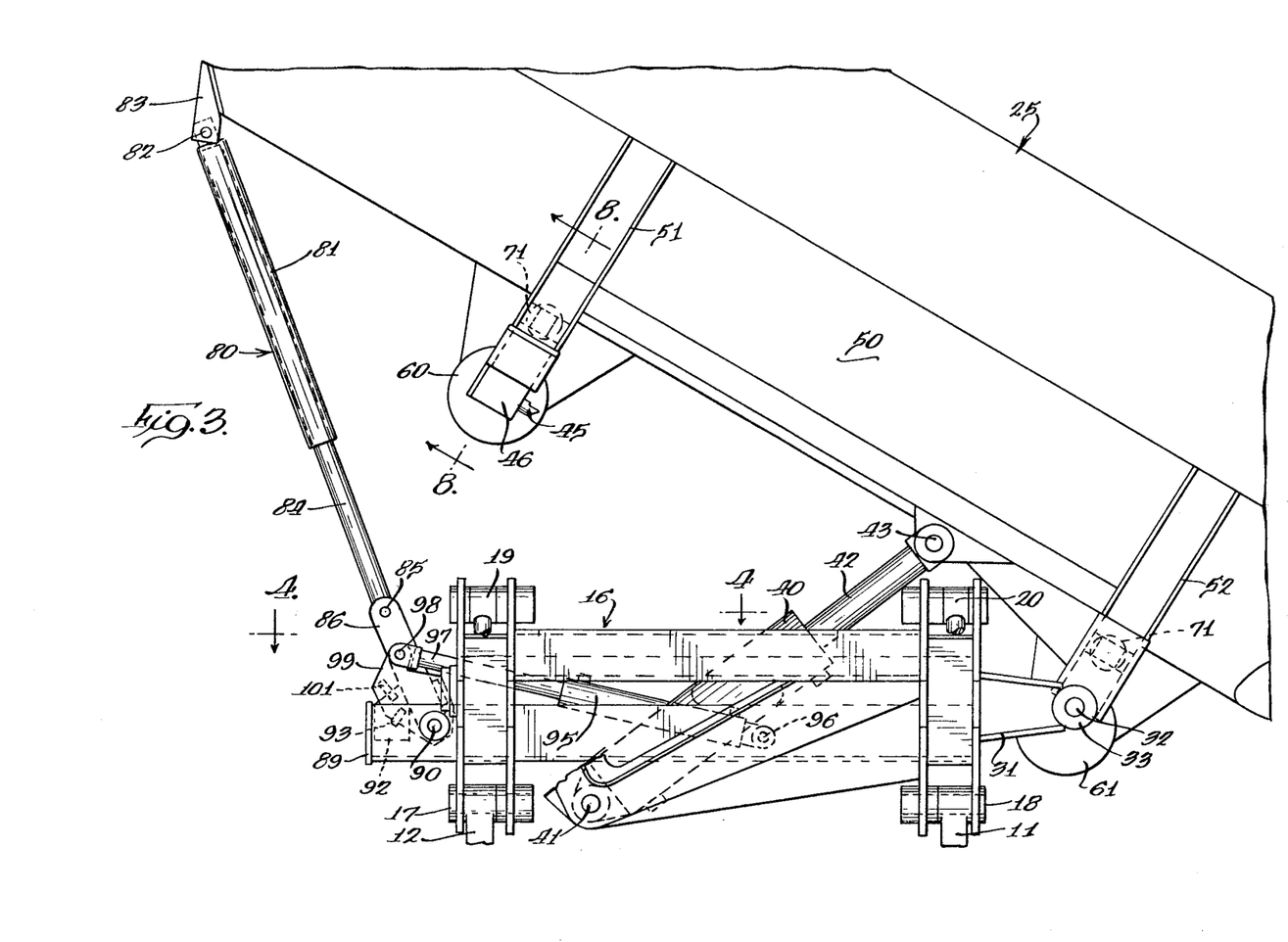
FIG. 3 is a plan view of the structure shown in FIG. 1 and as positioned in FIG. 1.
Figure 4:
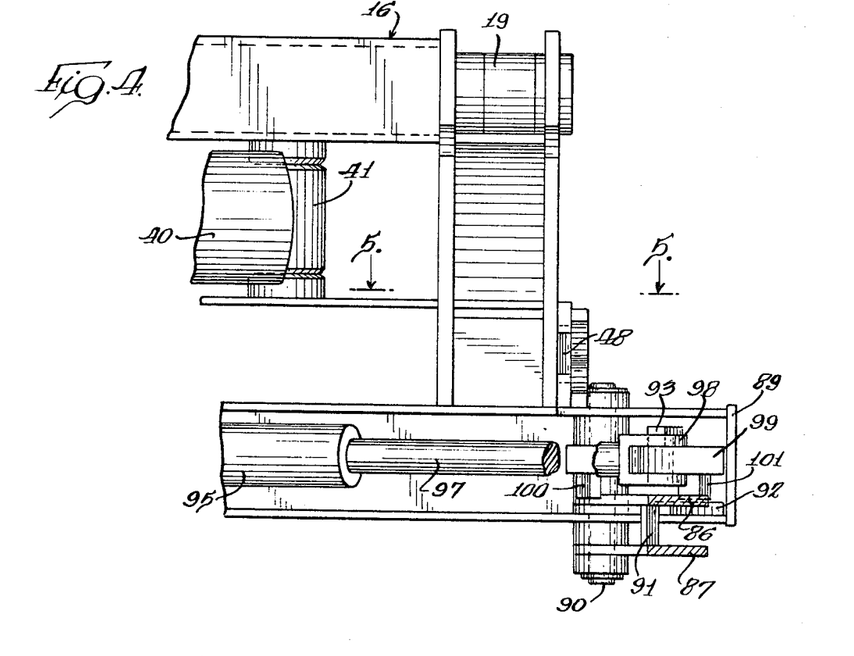
FIG. 4 is a section taken generally along the line 4—4 in FIG. 3 and on an enlarged scale.
Figure 5:
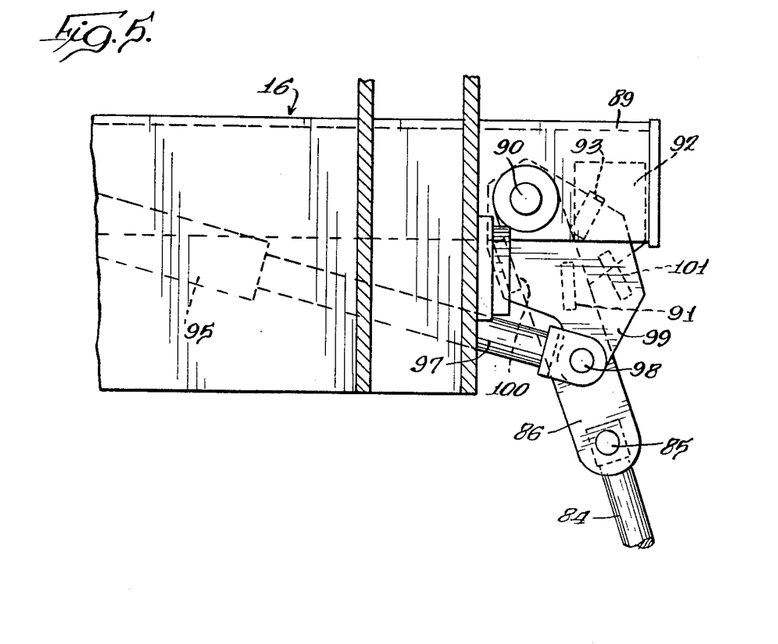
FIG. 5 is a section taken generally along the line 5—5 in FIG. 4.
Figure 6:
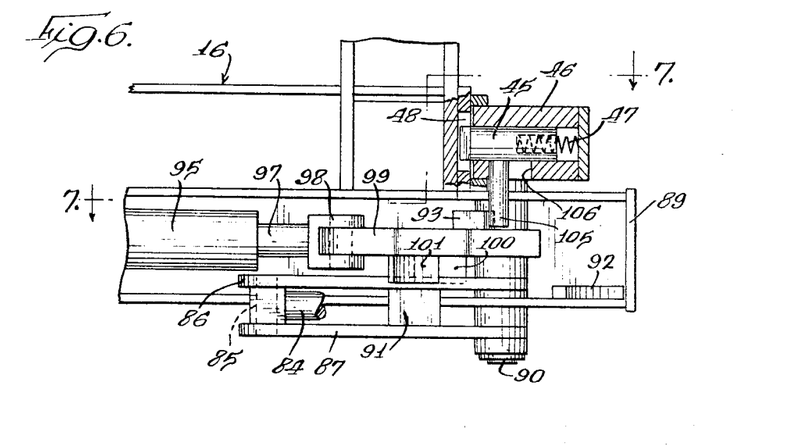
FIG. 6 is a view similar to FIG. 4 but showing the bucket in retracted position and latched to the cradle.
Figure 7:
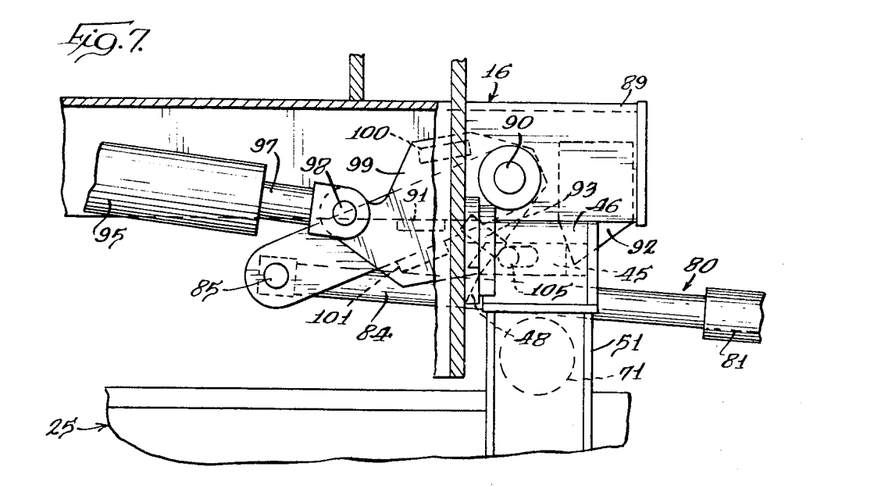
FIG. 7 is a sectional view taken generally along the line 7—7 in FIG. 6.

The bucket 25 is latched in the full line position, shown in FIG. 2, to the cradle 16 by means of a retractable latch 45 carried at the rear of the bucket 25 in a housing 46, as shown particularly in FIGS. 3, 6 and 7. The latch 45 is spring-urged outwardly of the housing by a spring 47 to have an end thereof engageable behind a catch 48 on the cradle frame and as shown in FIG. 6. The latch can move to the latching position by a cam-shaped end on the latch riding up an inclined ramp on the catch 48 to retract the latch against the action of the spring 47. The latch is releasable to permit movement of the bucket relative to the cradle by structure described hereinafer.

The structure described above is generally known in the art in having a tiltable cradle 16 and a bucket 25 pivotal on the cradle. A primary distinction in the structure described is in the bucket 25 additionally having a plowing position at a plowing angle which is at an angle between the full line and the broken line positions shown in FIG. 2, with the length of the bucket 25 enabling the bucket to span the path of the vehicle as shown by the front vehicle wheels 10 in broken line in FIG. 2.

The bucket 25 is shown particularly in FIGS. 1, 2, 8 and 9 and has a concave wrapper 50 extending from top to bottom thereof when in plowing position and forming a bottom for the bucket when used as a loader. The wrapper has a pair of support frame members 51 and 52 at the rear thereof with the member 52 providing a support for the pivot ears 33 and 34 which pivotally mount the bucket to the cradle. The frame member 51 provides a mounting for the latch housing 46 as shown in FIG. 3. A plow blade 53 extends along an edge of the bucket to permit plowing when in the position shown in FIGS. 1 and 8 and shown in full line in FIG. 9 and further constitutes a cutting edge when loading. One end of the bucket is closed by a planar wall 54 and the other end is partially closed by a sloped panel 55 which is formed as a section of a right cylinder to form a discharge spout when plowing material such as snow, and also in dumping of the bucket to the side to obtain focusing of the material as it is discharged. The right cylinder section necessarily also functions well when plowing.

More specifically, the bucket wrapper 50 has a front terminal section 50a adjacent the blade 53 and a rear, or upper, terminal section 50b at the opposite end of the wrapper which merge into the major part of the wrapper. These terminal sections, as shown, are substantially straight or can be slightly curved and with the included angle between the tangents to the two terminal sections being in the range of 80–100° and, as shown, being approximately 80°. A spill blade 50c extends across the top of the bucket, as shown in FIGS. 8 and 9 and holds a load in elevated position, as shown in broken line in FIG. 12.

For support of the bucket when plowing, a pair of skid shoes 60 and 61 is mounted to the rear of the bucket for movement between the operative position, shown in full line, and an inopeartive, stored position, shown in broken line in FIG. 8. These shoes also can function in a bucket loading operation as both skid shoes and pry-out fulcrums. Each of the shoes is mounted on an arm 63 pivoted at 64 to a bracket 65 on the underside of the bucket for pivotal movement between the two positions shown in FIG. 8. The upper side of the arm has a block 66 formed with an elongate guide track 67 for receiving a roller 68 carried at an end of an actuating link 69. The actuating link 69 is pivoted to the bucket frame member 51 by a pivot pin 70 positioned above the roller 68 when the skid shoe is in operative position to provide a generally straight line relation of the force acting through roller 68 and the pivot 70. Although the links 69 can be actuated manually if desired, means are shown for obtaining power movement of the actuating link and shoe in the form of a cylinder 71 pivoted at an end 72 to the frame member 51 and having its rod 73 pivoted to the actuating link at 74. With the structure disclosed herein, a small amount of force is required to retract the shoe by retracting the piston rod 73 with the result that as the skid shoe 60 pivots upwardly the roller 68 moves along the track 67. The opposite movement of the skid shoe to operative position occurs upon extension of the rod 73 with the action being fast and requiring only a short stroke cylinder. Each of the skid shoes 60 and 61 is independently mounted and has actuating structure therefor.

A primary novel result obtained by the construction disclosed herein is the use of the bucket as a plow in addition to the known bucket functions. As stated previously, one feature of this utilization is the added length of the bucket over those previously known, whereby when the bucket is at a selected plow angle in the range of 30 to 45 degrees to the forward line of path of vehicle travel, the plow will still span the width of the vehicle so that a path for the vehicle is plowed by the bucket. In order to withstand the forces encountered in plowing, the bucket is provided with a selectively positionable strut indicated generally at 80 which forms a rigid brace member when the plow is at a plowing angle as shown in FIGS. 1 and 3, but which can be retracted to permit movement of the plow to a position against the cradle as shown in full line in FIG. 2. Additionally, the strut 80 is extensible to permit tilting of the bucket to a greater angle than the plow angle as required in dumping. The strut 80 is formed of a tubular outer strut member 81 which is pinned by a pin 82 to a bracket 83 fastened to an end of the bucket remote from the bucket discharge end. A second strut member 84 telescopes within the outer member 81 and its exposed end is pivoted by a pin 85 to a pivoted strut section formed of upper and lower plates 86 and 87. The strut plates 86 and 87 are pivoted to a frame section 89 of the cradle 16 by a pin 90 and are interconnected by a plate 91.

The strut 80 is shown in bucket bracing position in FIGS. 1, 3, 4 and 5 with the strut sections in an over center position and with the upper strut plate 86 in abutting relation with an abutment plate 92 fastened to the cradle frame section 89. The strut 80 is shown in folded inoperative position in full line in FIG. 2 and FIGS. 6 and 7. In this latter position the strut plates 86 and 87 have pivoted about the pivot pin 90 with the strut 80 nested between the cradle 16 and the bucket 25.

Means for moving the strut from the folded position to the extended over center position where the upper strut plate 86 engages the abutment 92 includes a hydraulic cylinder 95 having an end pivoted at 96 to the cradle 16 as shown in FIG. 3, and having its cylinder rod 97 engaged by means of a pivot pin 98 to a plate 99 pivoted on the pin 90. The plate 99 has a pair of depending dogs 100 and 101 which loosely span the upper strut plate 86. With the parts positioned as shown in FIG. 7, extension of the cylinder rod 97 causes pivoting of the plate 99 to bring the dog 100 into engagement with the strut plate 86 and pivot the strut outwardly, with this movement being assisted by the main cylinder 40 until the plate 91 strikes the abutment 92. In retracting the strut, the cylinder rod 97 retracts and the dog 101 engages the upper strut plate 86 to swing the strut to the folded position shown in FIG. 7. An added function of the plate 99 is to cause release of the latch 45 as the initial operation in moving the bucket from the retracted full line position shown in FIG. 2 to an angle relative to the cradle 16. This is accomplished by having a lug 93 on the plate strike a depending pin 105 secured to the latch 45 and movable within an opening 106 in the latch housing 46 as shown in FIG. 6. This occurs prior to dog 100 contacting the upper strut plate 86.

With the strut 80 extended and the bucket 25 at the plow angle, the inner strut member 84 bottoms in the strut cylinder 81 to provide a rigid support for the bucket with the upper strut plate 86 engaging the abutment 92. In the event the bucket is to go to a greater angle, the inner strut member 84 can move outwardly of the cylinder strut member 81 without restriction to the bucket movement.

The control circuit for the cylinders described herein is shown in FIG. 10 and comprises a source of fluid under pressure supplied through line 120 with a return line 121 leading to tank. A manually operable control valve 122 controls the flow to either of lines 123 and 124 with line 123 connecting to a sequence valve 125 and lines 126 and 127 from the sequence valve leading to the main cylinder 40 and the strut actuating and latch releasing cylinder 95. Line 124 extends from the opposite ends of the main cylinder 40 and the cylinder 95. For automatic lowering operation of the skid shoes, a line 128 branches from line 127 to supply fluid to the cylinders 71 for the skid shoes. The skid shoes are raised by supplying fluid to the underside of the cylinders 71 through a line 129 branching off line 124. The control valve 122 would normally be mounted in the cab of the vehicle. The sequence valve 125 is in the circuit to make certain that the latch 45 is released prior to supply of fluid to the main cylinder 40. This is accomplished by having the sequence valve act at a predetermined pressure and a build-up in pressure must occur in the cylinder 95 before the sequence valve will open to supply fluid to the main cylinder 40. The cylinder 95 will always function in advance of main cylinder 40 to move the strut 80 back over center on returning the bucket to its position adjacent the cradle.

With the structure disclosed herein, the bucket loader and plow structure can be attached to a vehicle, such as a Caterpillar wheel loader by attachment of the four pivot pins 17, 18, 19 and 20. The bucket 25 can then be used in the normal bucket functions of loading, elevating and side discharging as controlled by the tilt of the cradle 16 about the pivot pins 17 and 18 along the axis transverse to the path of vehicle travel and with dumping under control of the main cylinder 40 causing pivoting of the bucket relative to the cradle. This can be accomplished by operation of the single control valve 122 which through the sequence valve makes certain that the latch 45 is released to permit movement of the bucket before the main cylinder 40 is actuated. In addition to the normal bucket loader functions the bucket 25 can be tipped forwardly by tilting of the cradle and the bucket placed at a plow angle relative to the cradle with the bucket having sufficient length and sufficient strength by use of the strut 80 to permit plowing by use of the plow blade 53 along the lower edge of the bucket when in the plowing position. The strut performs in a plowing operation to support the bucket and to reduce the size requirements for the main cylinder 40. The strut being extensible in one direction does not interfere with the movement of the bucket to a greater angle as required for dumping.

Figure 11:
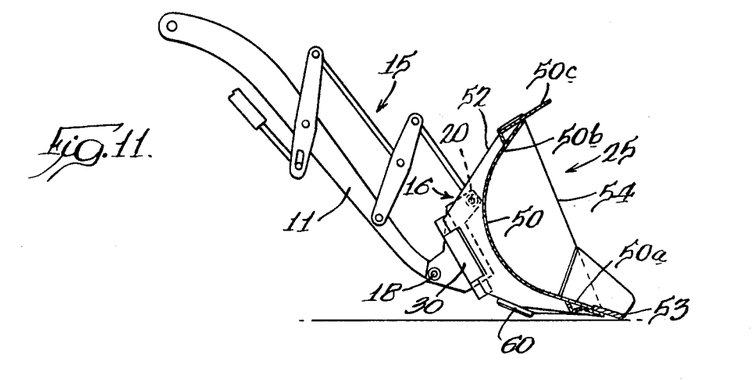
FIG. 11 is a fragmentary side elevation of the loading device as shown in hte loading position corresponding to the broken line position of FIG. 9 and with the bucket in vertical section.
Figures 12, 13:
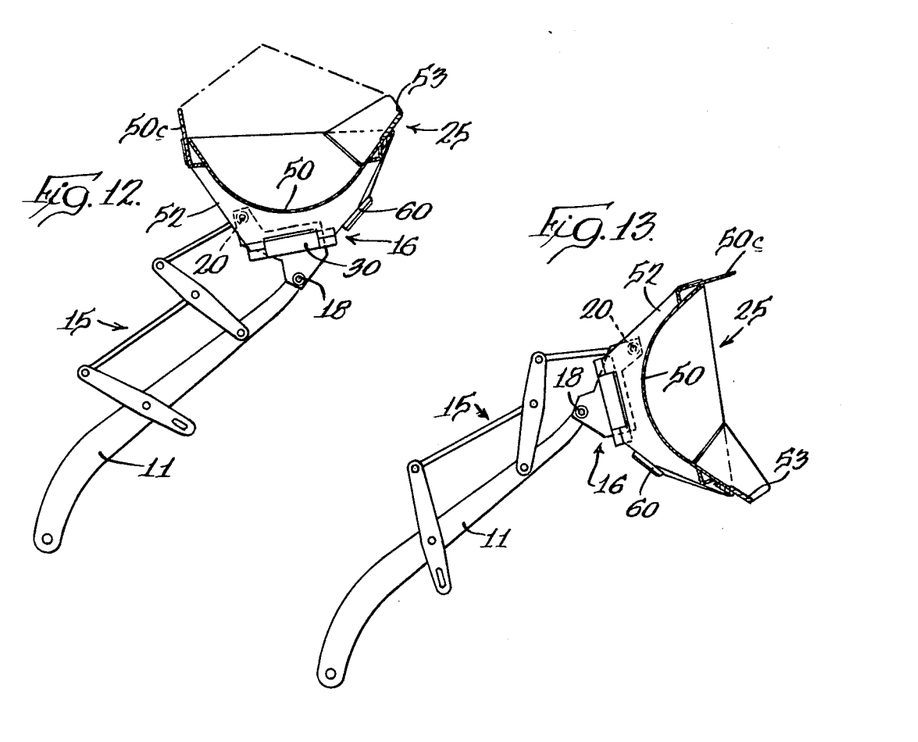
FIG. 12 is a side elevational view of the loading device with the bucket shown in section in an elevated load-holding position.
FIG. 13 is a view similar to FIG. 12 showing the bucket in load-dumping position.

Several different functions of the loading device are shown in FIGS. 9 and 11 to 13. As shown in FIG. 9 in full line, the bucket is in plowing position, while it is shown in loading position in broken line in FIG. 9. This same loading position is shown in FIG. 11. A load-supporting position with the bucket elevated is shown in FIG. 12 and the bucket is shown in an elevated dumping position in FIG. 13.

As shown in FIGS. 9 and 11, the bucket when in the initial, loading position has the front wrapper terminal section 50*a* disposed at an angle of approximately 20° to the ground when the cradle 16 is in position adjacent the ground, with the desired range of angle for the front terminal section of the wrapper being in the range of 20–30°. This disposition of the bucket provides for the lively loading action resulting from the material being lifted and rolled as the bucket enters into the material being loaded. In the loading position, the pivot pins 17 and 18 connecting the cradle 16 to the lift arms 11 and 12 define a first pivot axis for the cradle and bucket which is immediately above the ground. The pivot pins 19 and 20 which connect the cradle 16 to the tilt arm mechanism 15 define a second pivot axis spaced above the first pivot axis defined by the pins 17 and 18 and are positioned a short distance above the mid-part of the bucket. It will be seen that the bucket is relatively tall and shallow, the ratio of the distance between the front and back terminal sections to the depth of the bucket being approximately three to one, and when tilted rearwardly to a load-holding position, as shown in FIG. 12, the center of gravity of the load (broken line) will be toward the rear of the bucket, with the load being held by the spill blade 50*c*. This results in a more rearwardly centered load than with a conventional bucket and, thus, the bucket can handle a relatively large load, with a reduced penalty to the fore-to-aft stability of the basic machine in lifting the bucket out of a stockpile of material and in moving the vehicle over the ground.

FIG. 13 illustrates the dumping of a load from the bucket derived with reduced sacrifice in dumping height relative to a wall or barrier, as provided by the side of a truck or railway car. This is because most materials carried by the bucket would normally be fully ejected when the bucket reaches the position shown in FIG. 13, which is at an angle of approximately 45° to the horizontal and somewhat greater than the angle when in the loading position shown in broken line in FIG. 9 and in FIG. 11. With this construction of the bucket and its structural association with the cradle, the dumping position can be obtained by moving the bucket about the pivot axis defined by pivot pins 17 and 18, which brings the bucket to a level only slightly beneath this pivot axis. With conventional buckets, the bucket must tip down to an angle which puts the front edge of the bucket at a level substantially beneath the pivot mounting for the bucket which substantially reduces the ground clearance of the bucket. This situation becomes even more aggravated when an even larger conventionally shaped bucket is used since, as it is tipped down to the same angle, it will move even closer to the ground.

With the bucket construction disclosed herein, various types of material can be more simply loaded with a lively loading action as obtained by the shape of the bucket and its disposition relative to the ground in loading with this construction reducing the tendency to build up a parasitic load, since the lively loading action tends to scour the bucket and avoids the tendency of material to stick in the relatively deep pocket of a conventional bucket. Further the construction of the bucket and its mounting provides added stability to the basic machine or vehicle with which the bucket is associated and permits dumping of a load without any significant reduction and in some instances improvement in ground clearance for the bucket as the bucket is moved from an elevated load-supporting position to an elevated load-dumping position where the load is dumped forwardly out of the bucket. Finally, while the exemplary embodiment of the invention illustrates the bucket as being hingedly connected to the cradle for side dumping purposes, it will be recognized that if the side dumping feature is not required, the bucket could be stationarily connected to the cradle in which case the latter merely serves as a reinforcing mounting means on the bucket itself.

I claim:

1. A bucket device usable either as a forward dump loader, a side dump loader, or a plow, comprising, an elevating mounting for the bucket for support thereof by a vehicle, a bucket mounting cradle pivotally mounted on said elevating mounting and carrying the bucket for movement thereof between a generally upright load carrying position and a generally forward tipped position for plowing, means pivotally mounting the bucket on the cradle at a location between a discharge end of the bucket and the center thereof for movement about an axis extending transversely to the length of the bucket, means for moving said bucket about said axis to place said bucket adjacent the cradle in one extreme position and to another extreme position away from the cradle to place the bucket at a dumping angle and a position between said extreme positions to place said bucket at a plowing angle to the cradle, and a collapsible strut connected between the cradle and the bucket adjacent the end of the bucket opposite the discharge end to brace said bucket against forces encountered during plowing operation when the bucket is at the plowing angle, said strut comprising a first elongated element pivotally connected to said cradle and a second elongated element pivotally connected to said first elongated element and to said bucket.

2. A bucket device as claimed in claim 1, in which one of said elongated elements is extensible to permit movement of the bucket beyond the plowing angle to the dumping angle.

3. A bucket device as defined in claim 1, in which said bucket has a generally arcuate bottom formed by a bucket wrapper and a wall at said discharge end which is a cylindrical section sloped to intersect said wrapper and to form a discharge spout which focuses the material discharged thereover.

4. A bucket device usable either as a forward dump loader, a side dump loader, or a plow, comprising, an elevating mounting for the bucket for support thereof by a vehicle, a bucket mounting cradle pivotally mounted on said elevating mounting and carrying the bucket for movement thereof between a generally upright load carrying position and a generally forward tipped position for plowing, means pivotally mounting the bucket on the cradle at a location between a discharge end of the bucket and the center thereof for movement about an axis extending transversely to the length of the bucket, means for moving said bucket about said axis to place said bucket adjacent the cradle in one extreme position and to another extreme position away from the cradle to place the bucket at a dumping angle and a position between said extreme positions to place said bucket at a plowing angle to the cradle, and a strut connected between the cradle and the bucket adjacent the end of the bucket opposite the discharge end to brace said bucket against forces encountered during plowing operation when the bucket is at the plowing angle, said strut having one end pivotally connected to said bucket, and a pivotal strut section at the other end pivotally mounted to the cradle, and means for moving said strut in one direction to an over-center position against an abutment to place the strut in bucket bracing position when the bucket is at the plowing angle and to shift said strut in the opposite direction to the opposite side of center to permit pivoting of the strut on the cradle preliminary to movement of the bucket toward the cradle away from the plowing angle.

5. A bucket device as defined in claim 4, including latch means for holding the bucket in one extreme position adjacent the cradle, means for releasing said latch, and said means for moving said strut including a power cylinder which also activates said latch releasing means prior to moving said strut in said one direction.

6. A combination bucket loader and plow for mounting to a vehicle having a lift structure comprising, a cradle pivotally connectable to the lift structure for pivoting about a horizontal axis and carrying a bucket member for movement between a forwardly tilted plowing position with a plow blade adjacent the ground and an upright load carrying position, means pivotally mounting the bucket on the cradle for pivoting motion relative to the cradle about an axis extending transverse to the length of the bucket for movement between an extreme position in substantial parallelism with the cradle and another extreme position with the bucket at an angle to the cradle and with a discharge end of the bucket nearer the cradle, power means for pivoting said bucket relative to said cradle, and a strut member extending between the cradle and the bucket to brace the bucket when at a plowing angle between said extreme positions, said strut further comprising an element having one end pivotally connected to said bucket and a pivotal strut section pivotally connected to said element and pivotally mounted to the cradle, an abutment, and means for moving said strut to a very nearly dead-center position against the said abutment to place the strut in bucket bracing position when the bucket is at the plowing angle and to fold said strut away from said position to permit pivoting of the strut on the cradle preliminary to movement of the bucket toward the cradle away from the plowing angle, said bucket having a length to span the path of the vehicle when at the plowing angle, said discharge end of said bucket including means defining a discharge spout so that said bucket may be used alternately for front dumping in one of said extreme positions, side dumping in the other of said extreme positions and plowing at said plowing angle.

7. A bucket loader and plow combination comprising, a bucket having a plow blade along an edge thereof, means mounting said bucket for pivotal movement about two axes transverse to each other whereby the bucket can assume a variety of angles relative to the longitudinal axis of the vehicle mounting the bucket and can assume a variety of tilted positions about an axis transverse to said longitudinal axis, the combination of said angular movements permitting placement of said bucket in a loading position, a plowing position, a load elevating position, and a side dumping position, said bucket havng a concave wrapper with the plow blade extending along an edge thereof, a closing end wall across one end of the bucket and a discharge spout at the other end formed by a member shaped as a section of a cylinder and sloped to intersect said wrapper and form a load directing exit for material when the bucket is in side dumping position.

8. A bucket loader and plow combination comprising, a bucket having a plow blade along an edge thereof, means mounting said bucket for pivotal movement about two axes transverse to each other whereby the bucket can assume a variety of angles relative to the longitudinal axis of the vehicle mounting the bucket and can assume a variety of tilted positions about an axis transverse to said longitudinal axis, the combination of said angular movements permitting placement of said bucket in a loading position, a plowing position, a load elevatinb position, a forward dumping position, and a side dumping position, a pair of skid shoes for supporting said bucket when plowing, a mounting for a skid shoe comprising an arm pivoted to said bucket at one end thereof and carrying the shoe at the other end, a guide track extending along said arm, an actuator link pivoted to the bucket above the arm pivot and having an end movable in said guide track, whereby pivoting of the actuating link in one direction moves said end along the guide track to move the shoe to operative position with the actuating link aligned with the shoe and its pivot and with forces exerted on the shoe, and movement of the actuating link in the opposite direction with movement of said link end in said guide track retracts the shoe about its pivot to a bucket skidding or pryout position adjacent the bucket.

9. A bucket loader and plow device as defined in claim 8, in which said actuating link is pivoted intermediate its ends, an actuating cylinder connected to an end of said actuating link opposite the end engaging said guide track.

10. A combination bucket loader and plow for mounting to a vehicle having an elevatable boom comprising, a cradle pivotally connectable to the boom for pivoting about a horizontal axis and carrying a bucket member for movement between a tilted plowing position with a plow blade adjacent the ground and an upright load carrying position, means pivotally mounting the bucket on the cradle for pivoting motion relative to the cradle about an axis extending transverse to the length of the bucket for movement between an extreme position in substantial parallelism with the cradle and another extreme position with the bucket at an angle to the cradle and with a discharge end of the bucket nearer the cradle, a first power cylinder connected between the cradle and bucket for moving the bucket about said transverse axis, a strut member pivotally connected between the cradle and bucket for bracing said bucket when at the plow angle, said strut being movable to an over-center position, a releasable latch for holding the bucket against pivoting relative to the cradle, and a second power cylinder for releasing said latch and moving said strut to said over-center position, said cylinders being operable by a single control valve under the control of an operator.

11. A combination bucket loader and plow as defined in claim 10, in which a fluid circuit includes both said power cylinders, a control valve in said circuit for energizing said cylinders, and a sequence valve in said circuit to effect release of said latch by actuation of the second power cylinder therefor prior to movement of the first power cylinder to move the bucket.

12. A combination bucket loader and plow as defined in claim 10, in which said cradle has an abutment, said strut member has a pivoted section which is pivoted to the cradle, and an actuator member operated by said second power cylinder engageable with said pivoted section to move said section against the abutment to place the strut member in bracing position, said actuator member having means engageable with said pivoted section to move said section against the abutment to place the strut member in bracing position, said actuator member having means engageable with said latch for causing release thereof prior to movement of said pivoted section.

13. A combination bucket loader and plow as defined in claim 12, in which said strut member has two telescopic sections, means for preventing shortening movement of said sections to provide the bracing action while permitting lengthening thereof to permit movement of the bucket from a braced plowing angle to a greater side dumping angle relative to the cradle.

14. A combination bucket loader and plow as defined in claim 10, in which said first and second means each includes a power cylinder, a fluid circuit including both said power cylinders, a manually operable control valve in said circuit having one position for energizing both said cylinders, and a sequence valve in said circuit to effect release of said latch by actuation of the power cylinder therefor prior to movement of the other power cylinder to move the bucket.

15. A forward and side dump loader and snow plow comprising, a bucket mounting cradle pivotally mountable on a vehicle, a bucket mounted on the cradle for movement between a generally upright load carrying position and a forwardly tilted plowing position, means pivotally mounting the bucket on the cradle for movement about an axis extending generally transverse to the length of the bucket, means for moving said bucket about said axis to place said bucket in substantial parallelism with the cradle in one extreme position and to another extreme position with one end of said bucket away from the cradle to place the bucket at a dumping angle and a position between said extreme positions to place said bucket at a plowing angle to the cradle, a power cylinder for pivoting the bucket about said transverse axis, and a collapsible strut comprised of two pivotally interconnected elements respectively connected between the cradle and each other and the bucket to brace said bucket against forces encountered during plowing operation when the bucket is at the plowing angle, said strut being movably mounted and retractable from operative position to permit the bucket to move adjacent the cradle.

16. A combination bucket loader and snow plow for mounting to a vehicle having a lift structure comprising, a cradle pivotally connectable to the lift structure for pivoting about an axis transverse to the longitudinal axis of the vehicle and carrying a bucket member for movement between a tilted plowing position with a plow blade adjacent the ground and an upright load carrying position, means pivotally mounting the bucket on the cradle for pivoting about a second axis extending generally transverse to the length of the bucket for movement between an extreme position adjacent the cradle and another extreme position with the bucket at an angle to the cradle and in a discharging position, a first means connected between the cradle and bucket for moving the bucket about said second axis, a strut pivotally connected between the cradle and bucket, said strut being movable to an over-center position for bracing said bucket when at a plow angle, a releasable latch for holding the bucket against pivoting relative to the cradle, and a second means for releasing said latch and moving said strut to overcenter position.

17. A combination bucket loader and snow plow for mounting to a vehicle having a lift structure comprising, a cradle pivotally connectable to the lift structure for pivoting about an axis transverse to the longitudinal axis of the vehicle and carrying a bucket member for movement between a tilted plowing position with a plow blade adjacent the ground in an upright load carrying position, first means pivotally mounting the bucket on the cradle for pivoting motion relative to the cradle about a second axis extending generally transverse to the length of the bucket for movement between a first position in substantial parallelism to the cradle and a second position wherein the bucket is at an angle to the cradle, collapsible strut means interconnecting said bucket and said cradle and including first and second elongated elements, second means pivotally connecting one end of said first elongated element to said bucket at a point remote from said first means, third means pivotally connecting one end of the second elongated element to said cradle at a point remote from said first means, fourth means pivotally interconnecting the other ends of said first and second elongated elements and an abutment engageable by said collapsible strut means when said bucket is in said second position and operable to preclude collapsing of said collapsible strut means whereby said collapsible strut means braces said bucket when said bucket is in said second position.

References Cited
UNITED STATES PATENTS

| | | | |
|---|---|---|---|
| 3,092,920 | 6/1963 | Benno | 214—146 XR |
| 3,198,358 | 8/1965 | Gardner | 214—145 XR |
| 3,203,565 | 8/1965 | Keskitalo | 214—146 XR |
| 3,243,906 | 4/1966 | Washbond | 214—145 XR |
| 3,265,229 | 8/1966 | Koch | 214—140 |
| 3,291,330 | 12/1966 | Wagner | 214—140 |
| 3,324,954 | 6/1967 | Westendorf | 214—140 XR |
| 3,370,729 | 2/1968 | Clark | 214—145 |
| 2,064,023 | 12/1936 | Maloon | 37—126 |
| 2,274,904 | 3/1942 | Lawler | 37—144 |
| 2,313,534 | 3/1943 | Gledhill | 37—117.5 |
| 2,515,384 | 7/1950 | Von Carnop | 37—117.5 |
| 2,585,095 | 2/1952 | Daniels | 37—144 XR |
| 2,631,745 | 3/1953 | Addison | 37—144 |
| 2,684,163 | 7/1954 | Boulton | 37—117.5 XR |
| 2,730,823 | 1/1956 | Cassidy | 37—144 |
| 2,732,963 | 1/1956 | Grubich | 37—117.5 XR |
| 2,808,017 | 10/1957 | Killebrew | 37—117.5 XR |
| 2,924,345 | 2/1960 | Bodin | 37—117.5 XR |
| 2,933,838 | 4/1960 | Rockwell | 37—144 |
| 2,986,294 | 5/1961 | Granryd | 37—117.5 |
| 3,011,276 | 12/1961 | Likely | 37—144 |
| 3,074,190 | 1/1963 | Wahl | 37—117.5 XR |

EDGAR S. BURR, Primary Examiner

U.S. Cl. X.R.

214—140, 145